United States Patent
Hoffmann et al.

[11] Patent Number: 6,152,495
[45] Date of Patent: Nov. 28, 2000

[54] HOSE COUPLING FOR CONNECTING A HOSE WITH A SECOND COMPONENT

[75] Inventors: Heinrich Hoffmann, Heringen; Rolf-Dieter Schlein, Rotenburg, both of Germany

[73] Assignee: Mannesmann VDO AG, Frankfurt, Germany

[21] Appl. No.: 09/331,123

[22] PCT Filed: Dec. 16, 1997

[86] PCT No.: PCT/EP97/07064

§ 371 Date: Aug. 23, 1999

§ 102(e) Date: Aug. 23, 1999

[87] PCT Pub. No.: WO98/28565

PCT Pub. Date: Jul. 2, 1998

[30] Foreign Application Priority Data

Dec. 20, 1996 [DE] Germany .................. 196 53 257

[51] Int. Cl.[7] .................................... F16L 55/00
[52] U.S. Cl. .................. 285/148.19; 285/239; 285/921
[58] Field of Search .................. 285/239, 148.19, 285/921

[56] References Cited

U.S. PATENT DOCUMENTS

| | | | |
|---|---|---|---|
| 600,988 | 3/1898 | Hayes | 285/330 |
| 4,152,017 | 5/1979 | Abramson . | |
| 4,991,882 | 2/1991 | Gähwiler . | |
| 5,330,235 | 7/1994 | Wagner et al. | 285/921 |
| 5,403,046 | 4/1995 | Kooten | 285/921 |

FOREIGN PATENT DOCUMENTS

| | | |
|---|---|---|
| 2001535 | 9/1969 | France . |
| 2157651 | 6/1973 | France . |
| 4305609 | 11/1993 | Germany . |
| 4308367 | 9/1994 | Germany . |

*Primary Examiner*—Dave W. Arola
*Attorney, Agent, or Firm*—Martin A. Farber

[57] ABSTRACT

A hose coupling for connecting two hoses (3, 4) has two hose fittings (1, 2), which each have a coupling part (5, 6). One coupling part (5) has a radially encircling guide collar (7), which engages in a groove (9) made in a sleeve (8) of the other coupling part (6). The sleeve (8) is of elastic material in order to fit the coupling parts (5, 6) one inside the other in a simple manner.

10 Claims, 1 Drawing Sheet

HOSE COUPLING FOR CONNECTING A HOSE WITH A SECOND COMPONENT

FIELD AND BACKGROUND OF THE INVENTION

The invention relates to a hose coupling intended for connecting a hose to a second component and for hoses which are to be changed infrequently, in particular for a windshield washer unit of a motor vehicle, having a hose fitting designed so that a hose can be slipped onto it.

Such hose couplings are frequently used in modern motor vehicles for connecting a nozzle or a distributor of a windshield washer unit and are thus known. In this case, the second component has a number of hose fittings corresponding to the hoses to be connected and is produced in one piece with the distributor or the nozzle. In the simplest case, the second component is of tubular design having two hose fittings.

A disadvantage with the known hose coupling is that the hose can only be slipped onto the hose fitting with a high expenditure of force and this takes considerable time. This leads to a very cost-intensive final assembly, in particular in the case of the windshield washer unit in a motor vehicle.

In the case of hoses which are to be changed frequently, such as garden hoses for example, two-piece hose couplings which can be quickly disconnected and connected by means of a manually operable mechanism have been disclosed. However, due to the mechanism for the disconnecting and connecting, the hose coupling turns out to be very complicated.

SUMMARY OF THE INVENTION

The object of the invention is to provide a hose coupling of the type mentioned at the beginning in such a way that it is of especially simple construction and can be assembled as quickly as possible during the final assembly.

This problem is solved according to the invention in that the hose fitting and the second component each have a coupling part, and that one of the coupling parts has a radially encircling guide collar and the other coupling part has an elastic sleeve with a groove, the groove corresponding in width and diameter to the guide collar of the one coupling part.

Due to this construction, the hose is slipped onto the hose fitting as in the known hose coupling. The hose fitting can be connected to the second component with little expenditure of force and thus in an especially short time by simply pushing the guide collar of the one coupling part into the sleeve of the other coupling part. In this way, the installation of the windshield washer unit in the motor vehicle requires very little time and is thus especially cost-effective. Furthermore, the hose coupling according to the invention requires no additional mechanism for connecting and disconnecting the coupling parts, so that it is of especially simple construction and can also be manufactured cost-effectively. In the assembled state of the hose coupling, the margin remote from the free end of the guide collar bears against a margin of the groove and seals the hose coupling. At an especially high pressure inside the windshield washer unit, the margin of the guide collar is additionally pressed against the margin of the groove, so that the hose coupling according to the invention is especially tight without additional sealing elements.

The guide collar could, for example, be arched outward. In this way, the guide collar could be pivoted in the groove in a simple manner. However, in the case of the windshield washer unit installed in the motor vehicle, the hose couplings, in an advantageous development of the invention, are reliably held in their intended position if the guide collar of the one coupling part has a cylindrical section. In this way, leakages of the hose couplings are permanently avoided.

It helps to further improve the tightness of the hose coupling according to the invention if the one coupling part, at its free end, has a cone adjoining the guide collar, and the groove of the sleeve has a bevel in the region of the cone of the guide collar. As a result, the coupling parts, when being fitted together, have a resilient stop, a factor which ensures reliable latching of the guide collar in the groove. Furthermore, the bevel serves as tolerance compensation between the guide collar and the groove.

In another advantageous development of the invention, the coupling parts can be dismantled without damaging the components if the groove of the sleeve has a bevel in the region of that end of the guide collar which is remote from the cone.

In another advantageous development of the invention, rotation of the coupling parts relative to one another can be reliably avoided if the one coupling part, in the region of the cone, has, as an anti-rotation locking means, an axial projection engaging in a recess of the sleeve.

BRIEF DESCRIPTION OF THE DRAWING

The invention permits numerous embodiments. To further illustrate its basic principle, one of them is described below and is shown in the drawing, in which.

DETAILED DESCRIPTION OF THE PREFERRED EMBODIMENT

Figure 1:
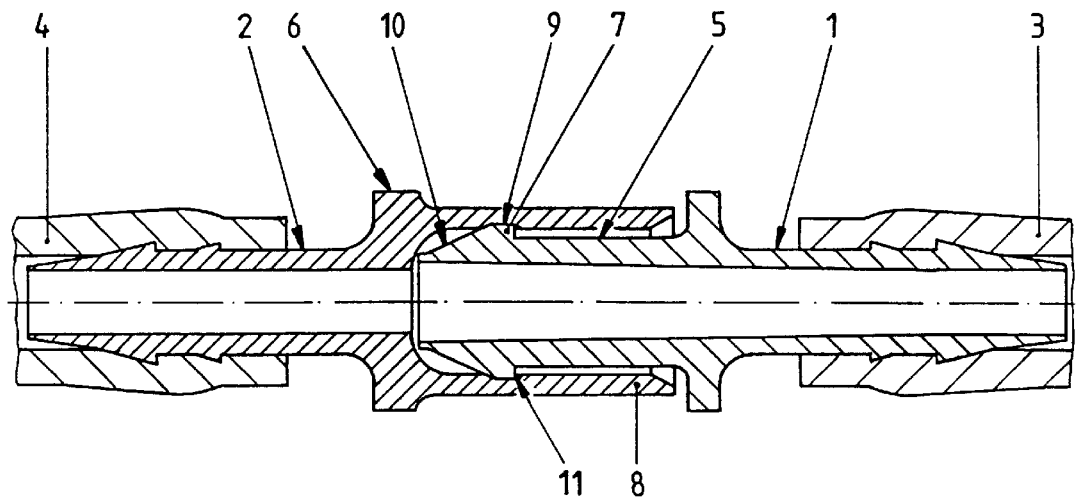
FIG. 1 shows a sectional representation of a hose coupling according to the invention having two coupling parts.

FIG. 1 shows a hose coupling having two hose fittings 1, 2, onto which in each case a hose 3, 4 of a windshield washer unit of a motor vehicle is slipped. The hose fittings 1, 2 each have a coupling part 5, 6. One of the coupling parts 5 has a radially encircling guide collar 7, which can be inserted into a sleeve 8 of the other coupling part 6. The sleeve 8 is of elastic design and has a groove 9 corresponding in width and diameter to the guide collar 7. At its free end, the one coupling part 5 has a cone 10 adjoining the guide collar 7 in order to facilitate insertion into the sleeve 8.

In the state shown of the hose coupling, the guide collar 7 is located in the groove 9 of the sleeve 8. In this case, a margin 11 defining the groove 9 toward the open end of the sleeve 8 engages behind the guide collar 7 and thus produces a positive-locking connection between the two hose fittings 1, 2. At an excess pressure in the hoses 3, 4, the hose coupling is pressed apart, so that the guide collar 7 is pressed against the margin 11 defining the groove 9 toward the open end of the sleeve 8. In this way, considerable tightness of the hose coupling is achieved. The guide collar 7 is of cylindrical form to avoid tilting in the groove 9. The hose fittings 1, 2 are hereby oriented with respect to one another in their intended position.

Figure 2:
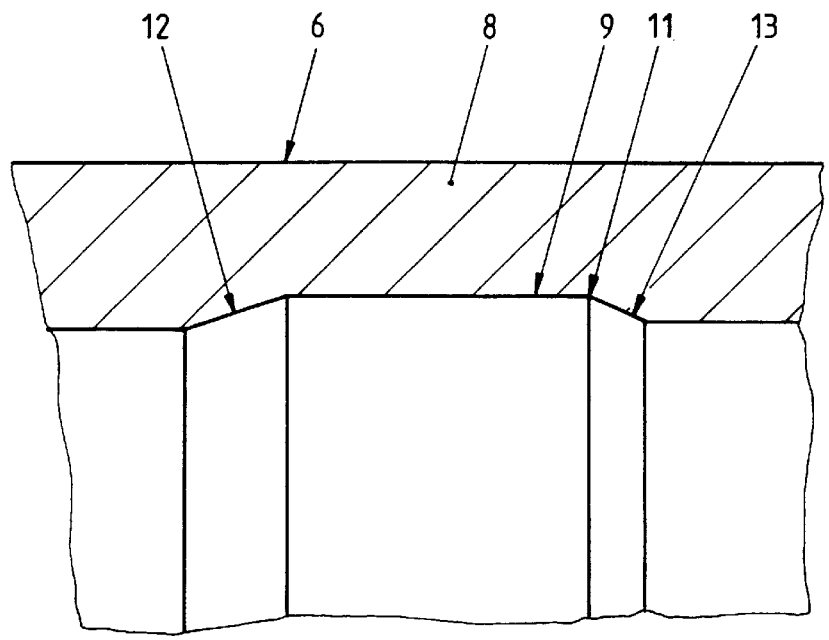
FIG. 2 shows a greatly enlarged representation of a groove in a sleeve of one of the coupling parts from FIG. 1.

The groove 9 of the sleeve 8 is depicted greatly enlarged in FIG. 2. The groove 9 has a cylindrical region, adjoining which are bevels 12, 13 on either side. One bevel 12 serves as a stop for the cone 10, shown in FIG. 1, of the guide collar 7 of the other coupling part 5. The second bevel 13 permits simple dismantling of the hose coupling.

What is claimed is:

1. A hose coupling intended for connecting a hose to a second component and for hoses which are to be changed infrequently, in particular for a windshield washer unit of a motor vehicle, having a hose fitting designed so that a hose can be slipped onto it, wherein the hose fitting (1) and the second component (hose fitting 2) each have a coupling part (5, 6), and wherein one of the coupling parts (5) has a radially encircling guide collar (7) and the other coupling part (6) has an elastic sleeve (8) with a groove (9), the groove (9) corresponding in width and diameter to the guide collar (7) of the one coupling part (5) engagingly locking and sealing said part against leakage.

2. The hose coupling as claimed in claim 1, wherein the guide collar (7) has a cylindrical section.

3. The hose coupling as claimed in claim 1, wherein the one coupling part (5), at its free end, has a cone (10) adjoining the guide collar (7), and the groove (9) of the sleeve (8) has a bevel (12) in the region of the cone (10) of the guide collar (7).

4. The hose coupling as claimed in claim 3, wherein the groove (9) of the sleeve (8) has a remote bevel (13) in the region of that end of the guide collar (7) which is remote from the cone.

5. The hose coupling as claimed in claim 4, wherein said remote bevel forms a margin defining said groove toward an open end of said sleeve which open end is remote from the cone, said margin engages behind said guide collar pressing against said guide collar producing a positive-locking connection of said guide collar and said groove and thereby of said coupling parts.

6. A hose coupling, in particular for a windshield washer unit of a motor vehicle, comprising two hose fittings which at one respective end are formed such that a hose can be slipped onto them, and each hose fitting has a coupling part at their respective other end, one said coupling part having an elastic sleeve with a groove and the other said coupling part having a radially encircling guide collar, there being only two of said coupling parts, the groove of said one coupling part corresponds in width and diameter to said guide collar of said other coupling part, said collar and said groove engagingly locking together and sealing the coupling parts against leakage, and said guide collar, toward a free end of said other coupling part, merges into a cone of decreasing diameter, a smallest diameter having a large clearance relative to an inside diameter of said elastic sleeve.

7. The hose coupling as claimed in claim 6, wherein said guide collar has a cylindrical section.

8. The hose coupling as claimed in claim 6, wherein the groove of said elastic sleeve has a bevel in a region of said cone of said guide collar.

9. The hose coupling as claimed in claim 6, wherein said groove of said sleeve has a remote bevel in a region of that end of said guide collar which is remote from the cone.

10. The hose coupling as claimed in claim 9, wherein said remote bevel forms a margin defining said groove toward an open end of said sleeve which open end is remote from the cone, said margin engages behind said guide collar pressing against said guide collar producing a positive-locking connection of said guide collar and said groove and thereby of said coupling parts.

* * * * *